(12) United States Patent
Craddock et al.

(10) Patent No.: US 8,417,911 B2
(45) Date of Patent: Apr. 9, 2013

(54) ASSOCIATING INPUT/OUTPUT DEVICE REQUESTS WITH MEMORY ASSOCIATED WITH A LOGICAL PARTITION

(75) Inventors: David Craddock, New Paltz, NY (US); Thomas A. Gregg, Highland, NY (US); Eric N. Lais, Tillson, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/821,224

(22) Filed: Jun. 23, 2010

(65) Prior Publication Data

US 2011/0320703 A1    Dec. 29, 2011

(51) Int. Cl.
G06F 13/00  (2006.01)
G06F 13/28  (2006.01)
G06F 3/00   (2006.01)

(52) U.S. Cl.
USPC .................. 711/173; 711/200; 711/E12.013; 710/11

(58) Field of Classification Search .................. 711/173, 711/200, E12.013; 710/11
See application file for complete search history.

(56) References Cited

U.S. PATENT DOCUMENTS

| | | |
|---|---|---|
| 4,104,539 A | 8/1978 | Hase |
| 4,611,319 A | 9/1986 | Naito |
| 4,644,443 A | 2/1987 | Swensen et al. |
| 5,027,254 A | 6/1991 | Corfits et al. |
| 5,170,472 A | 12/1992 | Cwiakala et al. |
| 5,282,274 A | 1/1994 | Liu |
| 5,430,856 A | 7/1995 | Kinoshita |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |
| 5,568,365 A | 10/1996 | Hahn et al. |
| 5,574,873 A | 11/1996 | Davidian |
| 5,600,805 A | 2/1997 | Fredericks et al. |
| 5,617,554 A | 4/1997 | Alpert et al. |
| 5,663,919 A | 9/1997 | Shirley et al. |

(Continued)

FOREIGN PATENT DOCUMENTS

| | | |
|---|---|---|
| JP | 57191826 | 11/1982 |
| JP | 5981724 | 5/1984 |

(Continued)

OTHER PUBLICATIONS

U.S. Appl. No. 12/821,124, filed Jun. 23, 2010.

(Continued)

*Primary Examiner* — Edward Dudek, Jr.
(74) *Attorney, Agent, or Firm* — Cantor Colburn LLP; Steven Chiu

(57) ABSTRACT

An address controller includes a bit selector that receives a first portion of a requester id and selects a bit from a vector that identifies whether a requesting function is an SR-IOV device or a standard PCIe device. The controller also includes a selector coupled to the bit selector that forms an output comprised of either a second portion of the RID or a first portion of the address portion based on an input received from the selector and an address control unit that receives the first portion of the RID and the output and determines the LPAR that owns the requesting function based thereon, the address control unit providing the corrected memory request to the memory.

17 Claims, 3 Drawing Sheets

U.S. PATENT DOCUMENTS

| | | | |
|---|---|---|---|
| 5,742,785 A | 4/1998 | Stone et al. | |
| 5,761,448 A | 6/1998 | Adamson et al. | |
| 5,790,825 A | 8/1998 | Traut | |
| 5,838,960 A | 11/1998 | Harriman, Jr. | |
| 5,870,598 A | 2/1999 | White et al. | |
| 5,949,646 A | 9/1999 | Lee et al. | |
| 5,960,213 A | 9/1999 | Wilson | |
| 5,963,425 A | 10/1999 | Chrysler et al. | |
| 6,009,261 A | 12/1999 | Scalzi et al. | |
| 6,023,736 A | 2/2000 | Lambeth et al. | |
| 6,067,595 A | 5/2000 | Lindenstruth | |
| 6,112,311 A | 8/2000 | Beardsley et al. | |
| 6,205,530 B1 | 3/2001 | Kang | |
| 6,301,133 B1 | 10/2001 | Cuadra et al. | |
| 6,308,255 B1 | 10/2001 | Gorishek, IV et al. | |
| 6,330,656 B1 | 12/2001 | Bealkowski et al. | |
| 6,341,064 B1 | 1/2002 | Bradley | |
| 6,349,380 B1 | 2/2002 | Shahidzadeh et al. | |
| 6,362,942 B2 | 3/2002 | Drapkin et al. | |
| 6,408,347 B1 | 6/2002 | Smith et al. | |
| 6,456,498 B1 | 9/2002 | Larson et al. | |
| 6,523,140 B1 | 2/2003 | Arndt et al. | |
| 6,538,881 B1 | 3/2003 | Jeakins et al. | |
| 6,544,311 B1 | 4/2003 | Walton et al. | |
| 6,594,148 B1 | 7/2003 | Nguyen et al. | |
| 6,595,018 B2 | 7/2003 | Goth et al. | |
| 6,625,169 B1 | 9/2003 | Tofano | |
| 6,625,648 B1 | 9/2003 | Schwaller et al. | |
| 6,643,727 B1 | 11/2003 | Arndt et al. | |
| 6,658,599 B1 | 12/2003 | Linam et al. | |
| 6,721,813 B2 | 4/2004 | Owen et al. | |
| 6,816,590 B2 | 11/2004 | Pike et al. | |
| 6,845,428 B1 | 1/2005 | Kedem | |
| 6,927,975 B2 | 8/2005 | Crippen et al. | |
| 6,950,438 B1 | 9/2005 | Owen et al. | |
| 6,973,510 B2 | 12/2005 | Arndt et al. | |
| 7,003,615 B2 | 2/2006 | Chiu et al. | |
| 7,004,233 B2 | 2/2006 | Hasegawa et al. | |
| 7,007,099 B1 | 2/2006 | Donati et al. | |
| 7,032,052 B2 | 4/2006 | Sauber et al. | |
| 7,042,734 B2 | 5/2006 | Hensley et al. | |
| 7,053,502 B2 | 5/2006 | Aihara et al. | |
| 7,062,594 B1 | 6/2006 | Sardella et al. | |
| 7,075,788 B2 | 7/2006 | Larson et al. | |
| 7,093,155 B2 | 8/2006 | Aoki | |
| 7,096,308 B2 | 8/2006 | Main et al. | |
| 7,107,331 B2 | 9/2006 | Gava et al. | |
| 7,107,495 B2 | 9/2006 | Kitamorn et al. | |
| 7,134,040 B2 | 11/2006 | Ayres | |
| 7,152,136 B1 | 12/2006 | Charagulla | |
| 7,163,546 B2 | 1/2007 | Mirizzi et al. | |
| 7,206,946 B2 | 4/2007 | Sakakibara et al. | |
| 7,219,181 B2 | 5/2007 | Carty | |
| 7,260,620 B1 | 8/2007 | Halasz | |
| 7,313,643 B2 | 12/2007 | Sakurai et al. | |
| 7,370,224 B1 | 5/2008 | Jaswa et al. | |
| 7,457,900 B2 | 11/2008 | Panesar | |
| 7,464,174 B1 | 12/2008 | Ngai | |
| 7,478,167 B2 | 1/2009 | Ould-Brahim et al. | |
| 7,480,303 B1 | 1/2009 | Ngai | |
| 7,519,647 B2 | 4/2009 | Carlough et al. | |
| 7,525,957 B2 | 4/2009 | Scherer et al. | |
| 7,535,828 B2 | 5/2009 | Raszuk et al. | |
| 7,546,386 B2 | 6/2009 | Arndt et al. | |
| 7,558,348 B1 | 7/2009 | Liu et al. | |
| 7,565,463 B2 | 7/2009 | Johnsen et al. | |
| 7,613,847 B2 | 11/2009 | Kjos et al. | |
| 7,617,340 B2 | 11/2009 | Gregg | |
| 7,617,345 B2 | 11/2009 | Clark et al. | |
| 7,624,235 B2 | 11/2009 | Wadhawan et al. | |
| 7,627,723 B1 | 12/2009 | Buck et al. | |
| 7,631,097 B2 | 12/2009 | Moch et al. | |
| 7,660,912 B2 | 2/2010 | Gregg | |
| 7,676,617 B2 | 3/2010 | Kloeppner | |
| 7,729,316 B2 | 6/2010 | Uhlik | |
| 7,836,254 B2 | 11/2010 | Gregg et al. | |
| 7,873,851 B1 | 1/2011 | Linnell et al. | |
| 7,975,076 B2 * | 7/2011 | Moriki et al. | 710/10 |
| 8,032,684 B2 | 10/2011 | Pettey et al. | |
| 8,041,811 B2 | 10/2011 | Calippe et al. | |
| 8,046,627 B2 | 10/2011 | Takubo | |
| 8,082,466 B2 | 12/2011 | Tanaka et al. | |
| 2002/0112067 A1 | 8/2002 | Chang et al. | |
| 2003/0056155 A1 | 3/2003 | Austen et al. | |
| 2003/0058618 A1 | 3/2003 | Soetemans et al. | |
| 2003/0097503 A1 | 5/2003 | Huckins | |
| 2003/0177221 A1 | 9/2003 | Ould-Brahim et al. | |
| 2003/0198180 A1 | 10/2003 | Cambron | |
| 2003/0200477 A1 | 10/2003 | Ayres | |
| 2004/0024905 A1 | 2/2004 | Liao et al. | |
| 2004/0117534 A1 | 6/2004 | Parry et al. | |
| 2004/0130868 A1 | 7/2004 | Schwartz et al. | |
| 2004/0133819 A1 | 7/2004 | Krishnamurthy et al. | |
| 2004/0136130 A1 | 7/2004 | Wimmer et al. | |
| 2004/0199700 A1 | 10/2004 | Clayton | |
| 2005/0024187 A1 | 2/2005 | Kranz et al. | |
| 2005/0033895 A1 | 2/2005 | Lueck et al. | |
| 2005/0071472 A1 | 3/2005 | Arndt et al. | |
| 2005/0091438 A1 | 4/2005 | Chatterjee | |
| 2005/0116546 A1 | 6/2005 | Zeighami et al. | |
| 2005/0146855 A1 | 7/2005 | Brehm et al. | |
| 2005/0160214 A1 | 7/2005 | Sauber et al. | |
| 2005/0162830 A1 | 7/2005 | Wortman et al. | |
| 2005/0182862 A1 | 8/2005 | Ritz et al. | |
| 2005/0213513 A1 | 9/2005 | Ngo et al. | |
| 2005/0276017 A1 | 12/2005 | Aziz et al. | |
| 2005/0286187 A1 | 12/2005 | Liu et al. | |
| 2005/0289271 A1 | 12/2005 | Martinez et al. | |
| 2005/0289278 A1 | 12/2005 | Tan et al. | |
| 2006/0067069 A1 | 3/2006 | Heard et al. | |
| 2006/0085150 A1 | 4/2006 | Gorin | |
| 2006/0085573 A1 | 4/2006 | Pike et al. | |
| 2006/0087813 A1 | 4/2006 | Becker et al. | |
| 2006/0087814 A1 | 4/2006 | Brandon et al. | |
| 2006/0095607 A1 | 5/2006 | Lim et al. | |
| 2006/0195644 A1 * | 8/2006 | Arndt et al. | 710/260 |
| 2006/0206639 A1 | 9/2006 | Tee et al. | |
| 2006/0230208 A1 | 10/2006 | Gregg et al. | |
| 2006/0236054 A1 | 10/2006 | Kitamura | |
| 2006/0253619 A1 | 11/2006 | Torudbakken et al. | |
| 2006/0288130 A1 | 12/2006 | Madukkarumukumana et al. | |
| 2006/0291447 A1 | 12/2006 | Siliquini et al. | |
| 2007/0008663 A1 | 1/2007 | Nakashima et al. | |
| 2007/0069585 A1 | 3/2007 | Bosco et al. | |
| 2007/0073955 A1 | 3/2007 | Murray et al. | |
| 2007/0078996 A1 | 4/2007 | Chen et al. | |
| 2007/0136554 A1 | 6/2007 | Biran et al. | |
| 2007/0168636 A1 | 7/2007 | Hummel et al. | |
| 2007/0183393 A1 | 8/2007 | Boyd et al. | |
| 2007/0186074 A1 | 8/2007 | Bradford et al. | |
| 2007/0211430 A1 | 9/2007 | Bechtolsheim | |
| 2007/0226386 A1 * | 9/2007 | Sharp et al. | 710/62 |
| 2007/0226523 A1 | 9/2007 | Chang | |
| 2007/0234018 A1 | 10/2007 | Feiste | |
| 2007/0239925 A1 | 10/2007 | Koishi | |
| 2007/0245041 A1 | 10/2007 | Hua et al. | |
| 2007/0271559 A1 | 11/2007 | Easton et al. | |
| 2007/0273018 A1 | 11/2007 | Onozuka et al. | |
| 2007/0274039 A1 | 11/2007 | Hamlin | |
| 2008/0043405 A1 | 2/2008 | Lee et al. | |
| 2008/0065796 A1 | 3/2008 | Lee et al. | |
| 2008/0091851 A1 | 4/2008 | Sierra | |
| 2008/0091868 A1 | 4/2008 | Mizrachi et al. | |
| 2008/0091915 A1 | 4/2008 | Moertl et al. | |
| 2008/0114906 A1 | 5/2008 | Hummel et al. | |
| 2008/0126648 A1 | 5/2008 | Brownlow et al. | |
| 2008/0126652 A1 | 5/2008 | Vembu et al. | |
| 2008/0147943 A1 | 6/2008 | Freimuth et al. | |
| 2008/0148295 A1 | 6/2008 | Freimuth et al. | |
| 2008/0162865 A1 | 7/2008 | Koufaty et al. | |
| 2008/0168208 A1 | 7/2008 | Gregg | |
| 2008/0189577 A1 | 8/2008 | Arndt et al. | |
| 2008/0192431 A1 | 8/2008 | Bechtolsheim | |
| 2008/0209114 A1 | 8/2008 | Chow et al. | |
| 2008/0222406 A1 | 9/2008 | Tabuchi | |
| 2008/0235425 A1 | 9/2008 | Belmar et al. | |
| 2008/0239687 A1 | 10/2008 | Leigh et al. | |

| | | | |
|---|---|---|---|
| 2008/0239945 | A1 | 10/2008 | Gregg |
| 2008/0259555 | A1 | 10/2008 | Bechtolsheim et al. |
| 2008/0263246 | A1 | 10/2008 | Larson et al. |
| 2008/0270853 | A1 | 10/2008 | Chagoly et al. |
| 2008/0288661 | A1 | 11/2008 | Galles |
| 2008/0310181 | A1 | 12/2008 | Gurevich et al. |
| 2009/0070760 | A1 | 3/2009 | Khatri et al. |
| 2009/0125666 | A1 | 5/2009 | Freking et al. |
| 2009/0144462 | A1 | 6/2009 | Arndt et al. |
| 2009/0144731 | A1 | 6/2009 | Brown et al. |
| 2009/0182966 | A1 | 7/2009 | Greiner et al. |
| 2009/0182969 | A1 | 7/2009 | Norgaard et al. |
| 2009/0210527 | A1 | 8/2009 | Kawato |
| 2009/0210646 | A1 | 8/2009 | BAuman et al. |
| 2009/0222814 | A1 | 9/2009 | Astrand |
| 2009/0234987 | A1 | 9/2009 | Lee et al. |
| 2009/0240849 | A1 | 9/2009 | Corneli et al. |
| 2009/0249039 | A1 | 10/2009 | Hook et al. |
| 2009/0276551 | A1* | 11/2009 | Brown et al. ............ 710/72 |
| 2009/0276773 | A1* | 11/2009 | Brown et al. ............ 718/1 |
| 2009/0276774 | A1 | 11/2009 | Kinoshita |
| 2009/0328035 | A1 | 12/2009 | Ganguly |
| 2010/0005234 | A1 | 1/2010 | Ganga et al. |
| 2010/0027559 | A1 | 2/2010 | Lin et al. |
| 2010/0077117 | A1 | 3/2010 | Asnaashari |
| 2010/0115329 | A1 | 5/2010 | Tanaka et al. |
| 2010/0131359 | A1 | 5/2010 | Ting et al. |
| 2010/0146089 | A1 | 6/2010 | Freimuth et al. |
| 2010/0157463 | A1 | 6/2010 | Arizono et al. |
| 2010/0211714 | A1 | 8/2010 | LePage |
| 2010/0312894 | A1 | 12/2010 | Awad et al. |
| 2011/0029696 | A1 | 2/2011 | Uehara |
| 2011/0029734 | A1 | 2/2011 | Pope et al. |
| 2011/0131359 | A1 | 6/2011 | Pettey et al. |
| 2011/0219161 | A1* | 9/2011 | Deshpande et al. ........ 710/305 |
| 2011/0258352 | A1* | 10/2011 | Williams et al. ........... 710/107 |
| 2011/0265134 | A1 | 10/2011 | Jaggi et al. |
| 2011/0317351 | A1 | 12/2011 | Pizzolato et al. |
| 2011/0317743 | A1 | 12/2011 | DeCusatis et al. |
| 2011/0320602 | A1 | 12/2011 | Carlson et al. |
| 2011/0320653 | A1 | 12/2011 | Lais et al. |
| 2011/0320666 | A1 | 12/2011 | Gregg et al. |
| 2011/0320670 | A1 | 12/2011 | Bayer et al. |
| 2011/0320674 | A1 | 12/2011 | Gregg et al. |
| 2011/0320675 | A1 | 12/2011 | Gregg et al. |
| 2011/0320796 | A1 | 12/2011 | DeCusatis et al. |
| 2011/0320861 | A1 | 12/2011 | Bayer et al. |
| 2011/0320887 | A1 | 12/2011 | Craddock et al. |
| 2011/0320892 | A1 | 12/2011 | Check et al. |

FOREIGN PATENT DOCUMENTS

| | | |
|---|---|---|
| JP | 6279557 | 4/1987 |
| JP | 0553973 | 3/1993 |
| WO | WO9600940 | 11/1996 |
| WO | 2009027189 A1 | 3/2009 |

OTHER PUBLICATIONS

U.S. Appl. No. 12/821,181, filed Jun. 23, 2010.
U.S. Appl. No. 12/821,182, filed Jun. 23, 2010.
U.S. Appl. No. 12/821,185, filed Jun. 23, 2010.
U.S. Appl. No. 12/821,191, filed Jun. 23, 2010.
U.S. Appl. No. 12/821,648, filed Jun. 23, 2010.
z/Architecture Principles of Operation, Feb. 2009; pp. 1-1344.
U.S. Appl. No. 12/821,221, filed Jun. 23, 2010.
U.S. Appl. No. 12/821,222, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,242, filed Jun. 23, 2010.
U.S. Appl. No. 12/821,243, filed Jun. 23, 2010.
U.S. Appl. No. 12,821,245, filed Jun. 23, 2010.
U.S. Appl. No. 12/821,247, filed Jun. 23, 2010.
U.S. Appl. No. 12/821,248, filed Jun. 23, 2010.
U.S. Appl. No. 12/821,250, filed Jun. 23, 2010.
U.S. Appl. No. 12/821,256, filed Jun. 23, 2010.
U.S. Appl. No. 12/821,271, filed Jun. 23, 2010.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.

Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages. 892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/6969/<retrieved on Jan. 26, 2010>.
K. Vaidyanathan et al.; "Exploiting RDMA Operations for Providing Efficient Fine-Grained Resource Monitoring in Cluster-Based Servers"; Jun. 2006; pp. 10; Downloaded: Apr. 13, 2010 at 18:53:46 UTC from IEEE Xplore. 1-4244-0328-6/06.
Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers—USENIX Annual Teleconference (No. 98); Entitled: "General Purpose Operating System Support for Multiple Page Sizes" 1998; pp. 1-9.
Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
Swift, Micael M. et al., "Improving the Reliability of Commodity Operating Systems," ACM Transactions on Computer Systems, vol. 23, No. 1, Feb. 2005, pp. 77-110.
Talluri et al., "A New Page Table for 64-bit Address Spaces," ACM SIGOPS Operating Systems Review, vol. 29, Issue 5 (Dec. 1995), pp. 194-200.
VTdHowTo—Xen Wiki; Downloaded—Apr. 16, 2010; pp. 1-5; http://wiki.xensource.com/xenwiki/VTdHowTo.
Winwood, Simon, et al., "Multiple Page Size Support in the Linux Kernel", Proceedings of Ottawa Linux Symposium, 2002.
Xu, Min et al., "Towards a VMM-based Usage Control Framework for OS Kernel Integrity Protection," SACMAT '07, Jun. 20-22, 2007, Sophia Antipolis, France, pp. 71-80.
z/VM: Running Guest Operating Systems, IBM Publication No. SC24-5997-02, Oct. 2001.
Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.
J. Regula, "Using Non-transparent Bridging in PCI Express Systems", PLX Technology, Inc., pp. 1-31, Jun. 1, 2004.
Jack Regula; "Ethernet Tunneling through PCI Express Inter-Processor Communication, Low Latency Storage IO Source"; www.wwpi.com; publisher: Computer Technology Review; Jan. 19, 2009.
Robert F. Kern, "IBM System z & DS8000 Technology Synergy", IBM ATS Americas Disk Storage; Jul. 21, 2009, pp. 1-25.
Szwed et al.; "Managing Connected PCI Express Root Complexes"; Dated: Dec. 23, 2009—6 pages.
International Search Report for PCT/EP2011/059810, Sep. 14, 2011.
PCI Express; "PCI Express Base Specification" Rev 1.0a; p. 1-2, 31, 35-36, 43-44, 49-51, 55, 59-62, 74, 101; Apr. 15, 2003.
Final Office Action mail date Jun. 15, 2011 for U.S. Appl. No. 12/821,221.
Non-final office Action dated Nov. 8, 2012 for U.S. Appl. No. 12/821,239.
Final Office Action dated Aug. 30, 2012 for U.S. Appl. No. 12/821,245.

Non-final Office Action dated Sep. 26, 2012 for U.S. Appl. No. 12/821,243.
Final Office Action dated Sep. 13, 2012 for U.S. Appl. No. 12/821,256.
Final Office Action Received Mar. 2, 2012 for U.S. Appl. No. 12/821,221.
Final Office Action received Oct. 10, 2012 for U.S. Appl. No. 12/821,221.
Non-final Office Action dated Jun. 5, 2012 for U.S. Appl. No. 12/821,221.
Non-final Office Action received Oct. 11, 2012 for U.S. Appl. No. 12/821,247.
Final Office Action dated Jul. 19, 2012 for U.S. Appl. No. 12/821,250.
Non Final Office Action recieved May 8, 2012 for U.S. Appl. No. 12/821,243.
Non Final Office Action received Mar. 15, 2012 for U.S. Appl. No. 12/821,242.
Non Final Office Action received May 4, 2012 for U.S. Appl. No. 12/821,256.

* cited by examiner

ASSOCIATING INPUT/OUTPUT DEVICE REQUESTS WITH MEMORY ASSOCIATED WITH A LOGICAL PARTITION

BACKGROUND

The present invention relates to computing devices and, more specifically, to systems and methods for associating input/output (I/O) requests with memory ranges assigned to particular logical partition (LPAR).

In a computing system, a logical partition (LPAR) is a subset of computer's hardware resources, vitualized as a separate computer. In effect, a physical machine can be partitioned into multiple LPARs, each supporting a separate instance of an operating system.

Each LPAR may access memory from a common memory subsystem, provided that the ranges of addresses directly accessible to each do not overlap. That is, each LPAR may be associated with a particular memory range. Special care is taken to ensure that that one LPAR cannot affect the memory assigned to another LPAR. One LPAR may, however, indirectly affect memory of a second partition, but only by commanding a process of the second partition to directly operate on its memory.

At any given time, an LPAR may be associated with one or more PCIe devices (I/O cards). Typically, multiple I/O cards are coupled to PCIe switches and the LPAR communicates to the individual cards through the PCIe switch.

In some cases, an I/O card or other PCIe device may comply with the Single Root I/O Virtualization (SR-IOV) specification. The SR-IOV specification allows a single PCIe device to represent multiple virtual devices where each virtual device appears to be a separate physical PCIe device. Thus, in the server context, a single I/O card conforming to the SR-IOV specification may be partitioned into multiple virtual devices. Such PCIe devices shall be referred to herein as "SR-IOV devices." In other cases, the PCIe devices may only represent one device and are referred to herein as "standard PCIe devices."

In operation, when an LPAR is controlling a PCIe device that device may need to read from or write to the memory associated with the LPAR. It is important that the PCIe device only have access to the memory range associated with the LPAR controlling it. Otherwise, one LPAR may indirectly affect the memory range assigned to another LPAR though memory access operations performed by a PCIe device.

In the case of SR-IOV compliant devices, a function number portion of the requestor ID (RID) identifies the particular virtual device. This function number may be associated with a particular LPAR and the LPAR may instruct the virtual device to use any address in the PCI address space. In the case of a non-SR-IOV compliant devices such a function number is not provided, and firmware may ensure that the addresses in requests made by the device are located within the memory range for the LPAR.

The difference in memory address request formats has required that each PCIe Root Complex be connected to only one of the two types of PCIe devices. In some instances, however, it may be desirable to have both SR-IOV compliant devices and non-SR-IOV devices connected to a single Root Complex through one or more PCIe switches. Current systems may not adequately support such a connection while ensuring PCIe device memory access requests are contained in the memory assigned to the LPAR controlling the PCIe device.

SUMMARY

According to one embodiment of the present invention, an address controller that receives a memory access request from a requesting function, the request including an address portion and a requester identification (RID) and provides a corrected memory request to a memory that does not request access to a portion of the memory not assigned to a logical partition LPAR that owns the requesting function. The address controller of this embodiment includes a bit selector that receives a first portion of the RID and selects a bit from a vector that identifies whether the requesting function is an SR-IOV device or a standard PCIe device. The address controller also includes a selector coupled to the bit selector that forms an output comprised of either a second portion of the RID or a first portion of the address portion based on an input received from the selector. In addition, the address controller includes an address control unit that receives the first portion of the RID and the output and determines the LPAR that owns the requesting function based thereon, the address control unit providing the corrected memory request to the memory.

Another embodiment of the present invention is directed to a computing system comprising that includes a host computing device. The host computing device includes a memory having multiple ranges and a processor divided into two or more logical partitions, each logical partition being associated with a one of the multiple ranges. The system also includes an input/output hub coupled to the host computing device, a PCIe expansion card coupled to input/output hub and two or more I/O devices coupled to the PCIe expansion card, including an SR-IOV device and a standard PCIe device. In this embodiment, the input/output hub receives a memory access request from a one of the two or more I/O devices through the PCI expansion card and provides a corrected memory request to a memory that does not request access to a portion of the memory not assigned to a logical partition LPAR that owns the one of the I/O devices.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention may help ensure that a PCIe function memory access request does not access memory assigned to any LPAR other than the LPAR owning the function. This may be accomplished in one embodiment with a single circuit that may operate on requests from both SR-IOV devices and standard PCIe devices. As the term is used herein, a "function" refers to a particular PCIe device, whether a virtual device or standard device. Accordingly, an SR-IOV device may include one or more functions and a standard PCIe device includes only one function.

It will be assumed that when an LPAR is given ownership of a function, that ownership association is stored in some location, typically as device table. The association may be used to produce a Zone_ID used to index into a zone relocation mechanism to convert a zone absolute address into a system absolute address. The Zone_ID may be determined based on information contained in the PCIe request header.

As two different types of PCIe devices may exist, according to one embodiment, two different ways of determining the Zone_ID may be provided. In one embodiment, a single circuit may be utilized to determine the Zone_ID regardless of the type of PCIe device making the request. In the case of SR-IOV devices, the function may be identified by a portion of the PCI Requester ID (RID) field. In this case, the RID is used to determine the Zone_ID. In the case of standard PCIe devices there is only one function and no virtual functions. Thus, all RID fields are the same for all the LPARs and include only a bus number. Accordingly the bus number is supplemented with a portion of the PCIe address field to uniquely identify the requester and serve as the index into a table containing the Zone_ID associations.

Figure 1:
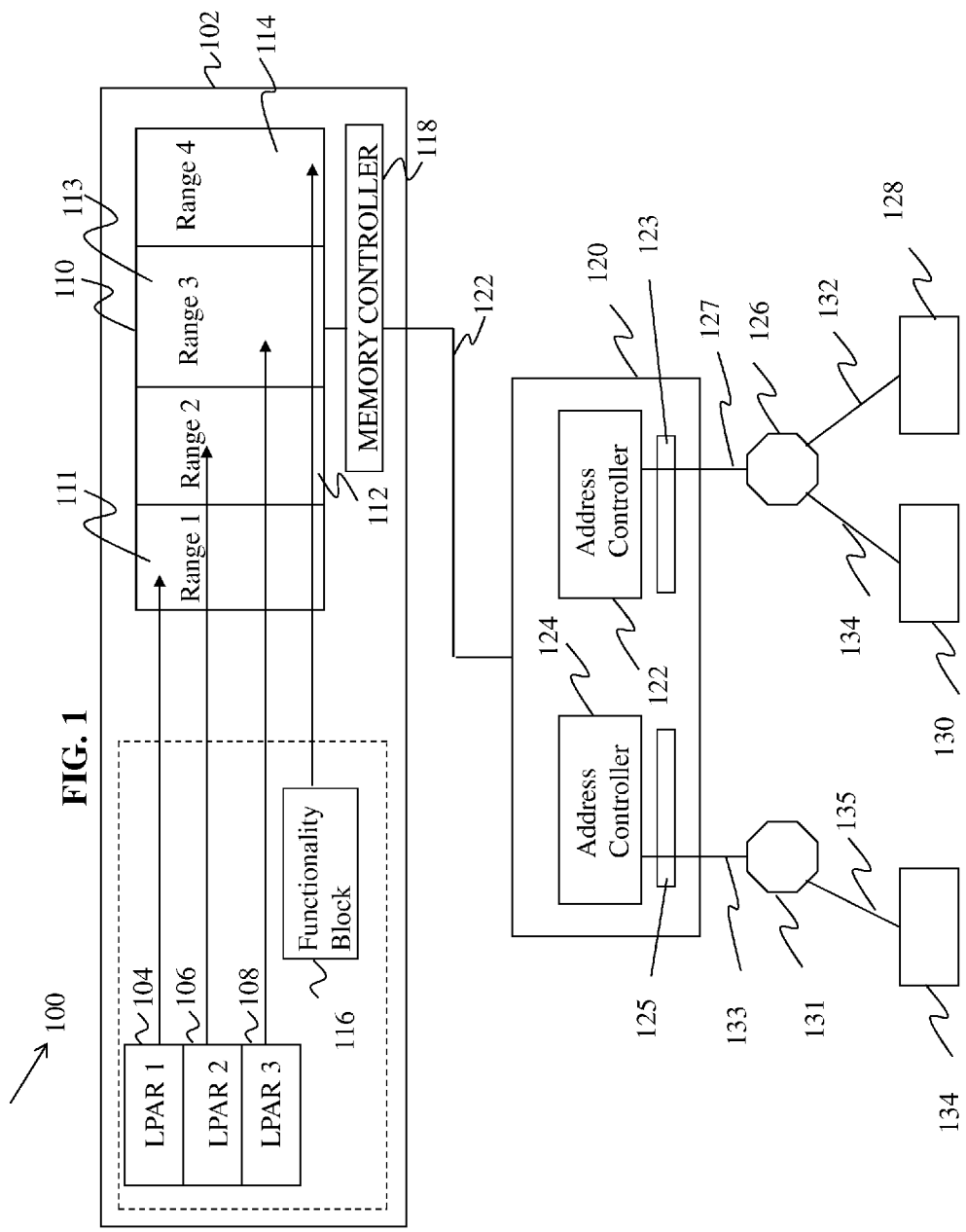
FIG. 1 shows one embodiment of a computing system according to one embodiment of the present invention.

FIG. 1 shows one embodiment of a computing system 100 according to one embodiment of the present invention. The computing system 100 includes a host computing device 102. It will be appreciated that the host computing device 102 can be any suitable computer or computing platform, and may include a terminal, wireless device, information appliance, device, workstation, mini-computer, mainframe computer, personal digital assistant (PDA) or other computing device. It shall be understood that the device 102 may include multiple computing devices linked together by a communication network. For example, there may exist a client-server relationship between two systems and processing may be split between the two.

The host computing device 102 may be divided into one or more logical partitions (LPARs). As shown, the host computing device 102 is divided into three LPARs, a first LPAR 104, a second LPAR 106 and a third LPAR 108. Of course, any number of LPARs could be formed.

Each LPAR 104, 106, and 108 may include its own operating system and run applications independent of one another. Examples of operating systems that may be supported by the LPARs 104, 106 and 108 include zOS, Windows 95, Windows 98, Windows NT 4.0, Windows XP, Windows 2000, Windows CE, Windows Vista, Mac OS, Java, AIX, LINUX, and UNIX, or any other suitable operating system.

The host computing device 102 may include memory 110. The memory may be divided into several ranges. These ranges may be assigned to individual LPARs. In the example shown in FIG. 1, the first LPAR 104 is assigned to a first memory range 111, the second LPAR 106 is assigned to a second memory 112, and the third LPAR 108 is assigned to a third memory range 113.

In addition, the host computing device 102 may include a functionality 116 that ensures that each LPAR only accesses memory assigned to it. This functionality 116 may include trusted firmware for assigning addresses for memory blocks and for controlling certain memory access requests for one or more functions. The functionality unit 116 may be assigned to a fourth memory range 114. The functionality unit 116 may operate in different manners depending on the type of adapter being accessed. For example, for an SR-IOV adapter, firmware in the functionality unit 116 configures the I/O hub 120 (discussed below) and then the owing LPAR is free to create control blocks containing the addresses to be used by the SR-IOV adapter. In contrast, for standard adapters, the functionality unit 116 receives requests from the owing LPAR and creates the control blocks. As such, the functionality unit 116 ensures that the addresses are within the range owned by the LPAR.

In operation, memory 110 is controlled by a memory controller 118. The memory controller 118 receives memory access requests from multiple locations. In one embodiment, the memory controller 118 may receive requests from one or more functions.

The system 100 may also include an I/O hub 120. The I/O hub 120 facilitates communication between the memory 110 and one or more functions. The I/O hub 120 is coupled to the host computing device 102 by an I/O bus 122. The I/O hub 120 may be included within the host computing device 102 in some embodiments.

The I/O hub 120 may include one or more address controllers according to one embodiment of the present invention. As shown if FIG. 1, the I/O hub 120 includes first address controller 122, a second address controller 124, a first root complex 123, and a second root complex 125. The first root complex 123 and the second root complex 125 include the functionality required to send and receive PCIe packets. This functionality may include header, link, and transaction processing. The first address controller 122 is coupled to a first PCIe expansion device 126 via a first PCIe connection 127. In one embodiment, the first PCIe expansion device 126 is located in an I/O drawer that includes multiple slots. The PCIe expansion device 126 may be coupled via a backplane to other slots in the I/O drawer. For ease of explanation, the connection is given what is referred to herein as a bus number. Accordingly, the bus number may refer to a particular slot a PCIe device is located.

In the example shown in FIG. 1, the first PCIe expansion device 126 is coupled by a first PCIe bus 132 to a first PCIe device 128. The first PCIe device 128, in this example, may be an SR-IOV device. That is, the first PCIe device 128 may support multiple functions. The first PCIe expansion device 126 may also be coupled by a second PCIe bus 134 to a second PCIe device 130. In this example, the second PCIe device 130 may a standard PCIe device. That is, it may only support a single function.

In addition, the second address controller 124 may be coupled to a second PCIe expansion device 131 through a second PCIe connection 133. The second PCIe expansion device 131 may be coupled to a third PCIe device 134 via a third PCIe bus 135 in the same or similar manner as described above.

In operation, the address controllers 122 and 124 receive memory access requests from one or more functions of the PCIe devices 128, 130 and 134. Each of these requests may include PCI Requester ID (RID) and an address field. The address field may be 64 bits wide in one embodiment.

Either the RID alone or a combination of the RID and a portion of the address, depending on the type of PCIe device making the request, may be utilized by the address controllers 122 and 124 to determine which LPAR owns the function making the request. Based on which LPAR owns the device, the address controllers 122 and 124 ensure that the address is within the memory range assigned to the LPAR that owns the function.

Figure 2:
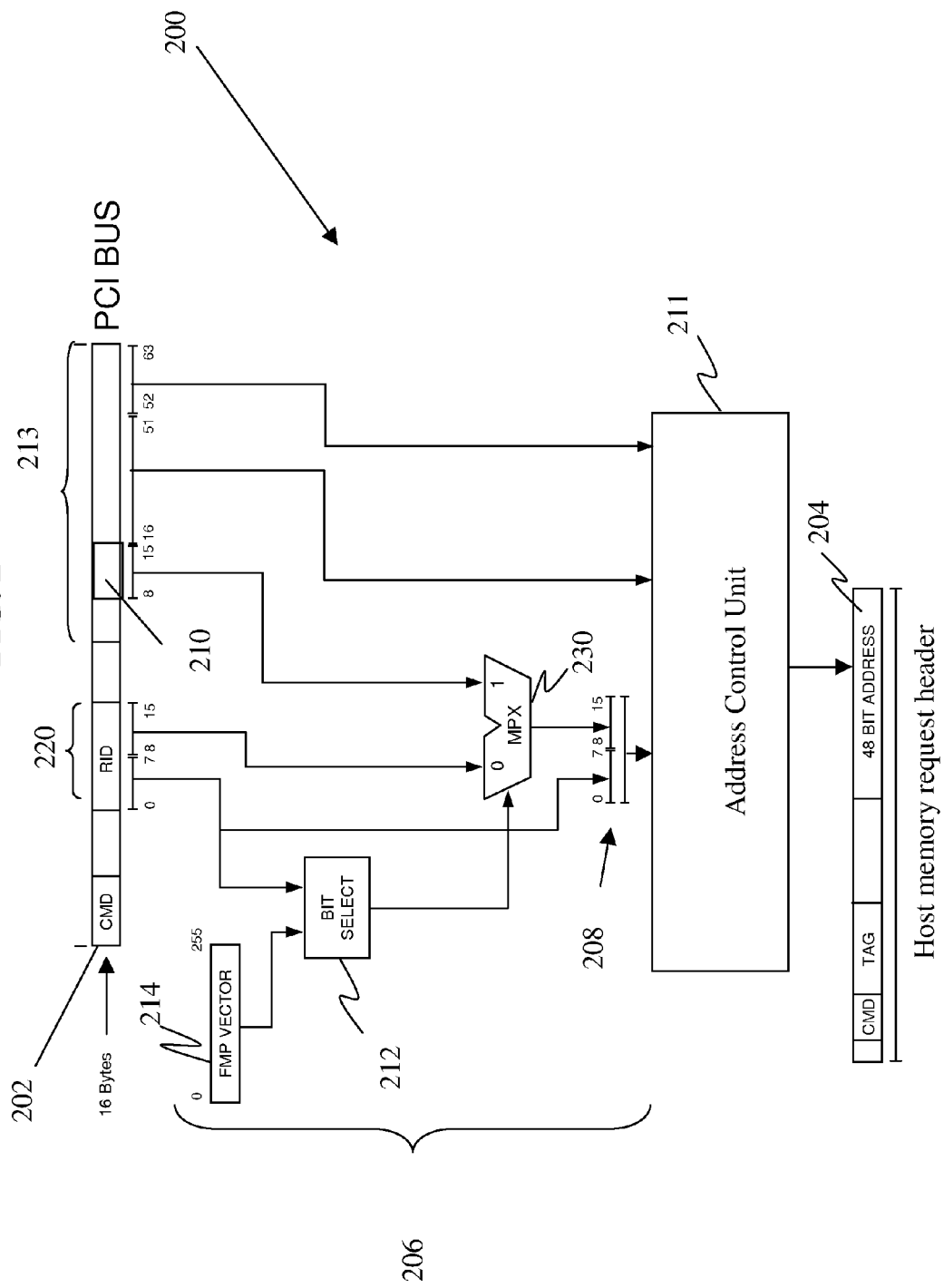
FIG. 2 shows an example of an address controller according to one embodiment of the present invention.

FIG. 2 shows an example of an address controller 200 according to one embodiment of the present invention. The address controller 200 receives a memory access request 202 from a function and outputs a real memory address 204 that is provided to the memory controller 118 (FIG. 1).

The address controller 200 includes a selection portion 206 that, based on the access request 202, creates an index 208 used by an address control unit 211 to identify the LPAR controlling the requesting function. The index 208 is created by selecting a first portion (shown as bits 0-7 in FIG. 2) of the RID 220 and combining them with either the remainder of the RID (in the case that an SR-IOV device is making the request) or with a portion 210 of the address portion 213 of the request 202 (in the case that a standard PCI device is making the request). In one embodiment, the portion 210 may be 8 bits wide.

In more detail the selection portion 206 includes a bit selector 212. The bit selector 212 receives the first portion of the RID. The bits of the first portion identify the bus (slot) number of the requesting function. This number is used by the bit selector 212 to select a bit from a vector 214. In one embodiment, the vector 214 may be created by either configuration firmware or an autodetect function that determines the type of PCIe card in each slot of an I/O drawer. The vector 214 may include either a 1 or zero in each bit where each bit corresponds to an individual PCIe bus number (i.e., slot in an I/O drawer).

The selected bit indicates whether the requesting device is an SR-IOV device or a standard PCIe device. For example, and as illustrated in FIG. 2, the vector 214 may store a zero to indicate that the device is an SR-IOV device and a 1 to indicate that it is a standard PCIe device.

In the case of SR-IOV compliant devices, the remainder (shown as bits 8-15 in FIG. 2) of the RID identify a particular virtual device. In the case of standard PCIe device, these bits are always zeros. The bit selector 212 may be coupled to a multiplexer 230 or other selection device that selects either the remainder of the RID or the portion 210 of the address 202 to produce the index 208. In the case where requesting device is a standard PCIe device the device is instructed, by a control block, what values are to be placed in the portion 210. In particular, the values in portion 210 may be assigned by the functionality block 116 (FIG. 1) and stored in a table for later use.

The index 208 is provided to the address control unit 211. The address control unit 211 may also receive at least a portion of the address 213. In one embodiment, the address control unit 211 receives 48 bits (e.g., bits 16-63) of the address 213 (in the case where the address is 64 bits long) and creates real memory address 208 therefrom in such a manner that the real address is located in the memory range assigned to the LPAR owing the requesting function. In one embodiment, the some of the bits (e.g., bits 52-63) of the address 213 are passed directly through the address control unit 211 because they may not be able to effect which memory range is selected because the ranges be greater than 1 megabyte. Of course, depending on the zone sizes, a different number of bits may not be altered.

Figure 3:
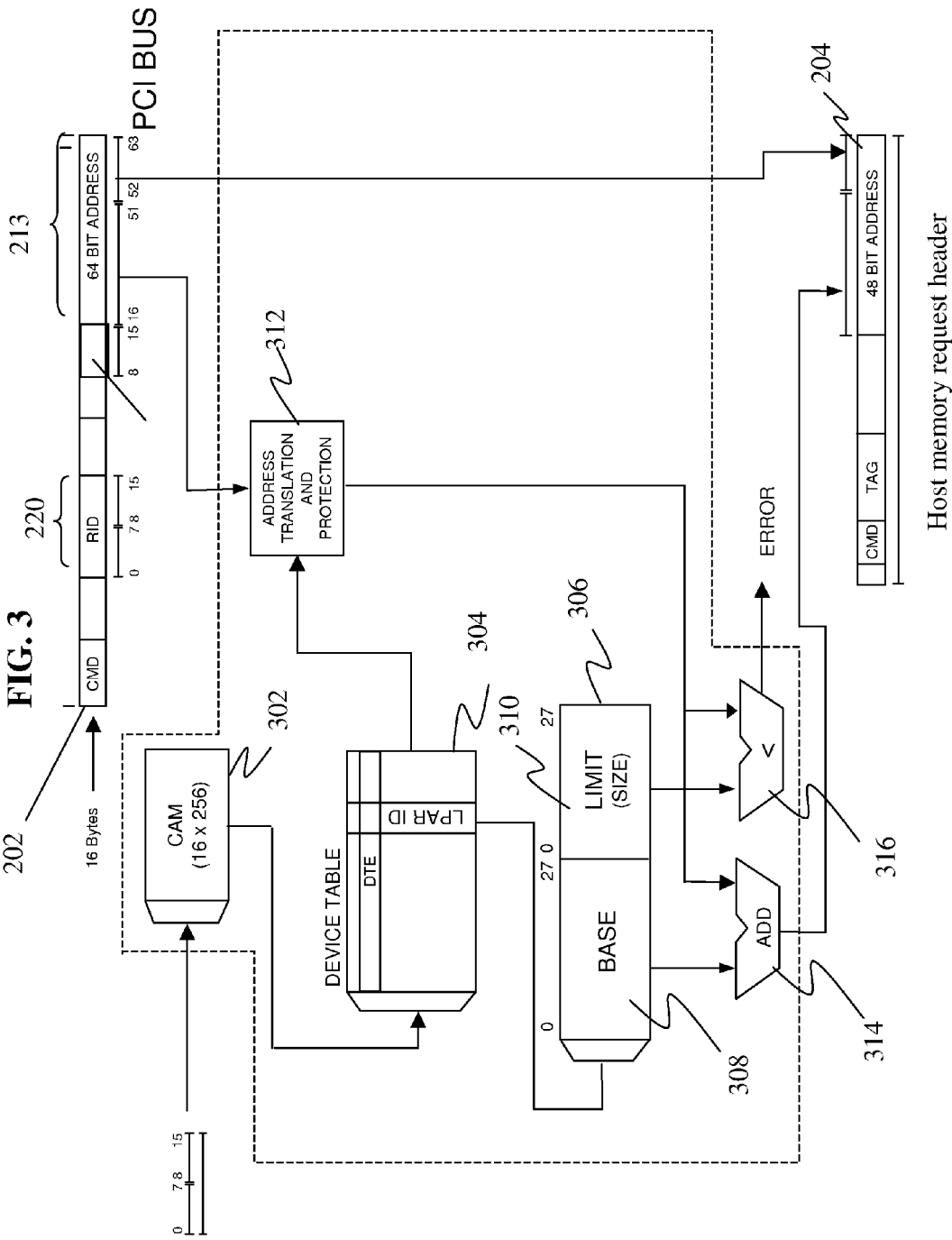
FIG. 3 shows an address control unit that is part of the address controller of FIG. 2 according to one embodiment.

FIG. 3 shows an address control unit 211 according to one embodiment. In this embodiment, the address correction includes a look-up table (LUT) 302. The LUT 302 includes an index to an entry in the device table 304 that in turn includes a record of which LPAR owns a particular function at a particular time. The LUT 302 is accessed by the index 208 which includes the bus number (card slot) and the function number or an assigned number of the requesting function. In one embodiment, the LUT is formed by a content addressable memory (CAM).

LUT 302 creates an output that is the index into a device table 304. The device table 304, based on the input, creates an LPAR identification of the LPAR owning the requesting function. The LPAR identification is an index into another table, the LPAR relocation table 306 that includes a base and size of a memory associated with each LPAR. Depending on the LPAR identified by the device table 304, the LPAR relocation table 306 outputs a base 308 and size output 310. The base output 308 identifies the real memory address of a particular range and the size output 310 indicates the real address of the upper limit of the range.

The address control unit 211 may also include an address translation and protection unit 312. This unit 211 converts a requested address to a real address in memory. The requesting function does not, however, know the range of memory assigned to the LPAR that owns it. Thus, the address is added to the base portion 308 by adder 314 to create a real memory address 204. However, in the event that the requested address is greater than a size of the memory range assigned to the LPAR as determined by comparator 316, an a error may be generated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An address controller that receives a memory access request from a requesting function, the request including an address portion and a requester identification (RID) and provides a corrected memory request to a memory, wherein the correct memory request does not request access to a portion of the memory not assigned to a logical partition LPAR that owns the requesting function, the address controller comprising:
 a bit selector that receives a first portion of the RID and selects a bit from a vector that identifies whether the requesting function is an SR-IOV device or a standard PCIe device;

a selector coupled to the bit selector that forms an output comprised of either a second portion of the RID or a first portion of the address portion based on an input received from the selector; and an address control unit that receives the first portion of the RID and the output and determines the LPAR that owns the requesting function based thereon, the address control unit providing the corrected memory request to the memory.

2. The address controller of claim 1, wherein the address controller is coupled to one or more PCIe expansion cards.

3. The address controller of claim 2, wherein at least one of the PCIe expansion cards is coupled to at least one SR-IOV device and at least one standard PCIe device.

4. The address controller of claim 1, wherein the corrected memory request includes an address corresponding to a real memory location in the memory.

5. The address controller of claim 1, wherein the address control unit includes a content addressable memory that determines the LPAR that owns the function.

6. The address controller of claim 5, wherein the address control unit includes a device table and a relocation table coupled to the device table.

7. The address controller of claim 6, wherein the device table receives an input from the content addressable memory and provides an output to the relocation table causing the relocation table to output the base and size for the LPAR that owns the function.

8. The address controller of claim 6, wherein the address control unit includes an adder that adds a second portion of the address to the base to create an address portion of the corrected memory request.

9. A computing system comprising:
a host computing device including:
a memory having multiple ranges;
a processor divided into two or more logical partitions, each logical partition being associated with a one of the multiple ranges;
an input/output hub coupled to the host computing device;
a PCIe expansion card coupled to input/output hub;
two or more I/O devices coupled to the PCIe expansion card, including an SR-IOV device and a standard PCIe device;

wherein the input/output hub receives a memory access request from a one of the two or more I/O devices through the PCI expansion card and provides a corrected memory request to a memory, wherein the correct memory request does not request access to a portion of the memory not assigned to a logical partition LPAR that owns the one of the I/O devices.

10. The computing system of claim 9, wherein the I/O hub includes a bit selector, the bit selector receiving a first portion of a requester identification (RID) contained in the memory access request and selects a bit from a vector that identifies whether the requesting I/O device is an SR-IOV device or a standard PCIe device.

11. The computing system of claim 10, wherein the I/O includes a selector coupled to the bit selector that forms an output comprised of either a second portion of the RID or a first portion of an address portion of the memory request based on an input received from the selector.

12. The computing system of claim 9, wherein the corrected memory request includes an address corresponding to a real memory location in the memory.

13. The computing system of claim 9, wherein the input/output hub includes an address control unit coupled an output of the selector.

14. The computing system of claim 13, wherein the address control unit includes a content addressable memory that determines the LPAR that owns the requesting I/O device.

15. The computing system of claim 14, wherein the wherein the address control unit includes a device table and a relocation table coupled to the device table.

16. The computing system of claim 15, wherein the device table receives an input from the content addressable memory and provides an output to the relocation table causing the relocation table to output the base and size for the LPAR that owns the function.

17. The address controller of claim 16, wherein the address control unit includes an adder that adds a second portion of the address portion of the memory request to the base to create an address portion of the corrected memory request.

* * * * *